UNITED STATES PATENT OFFICE.

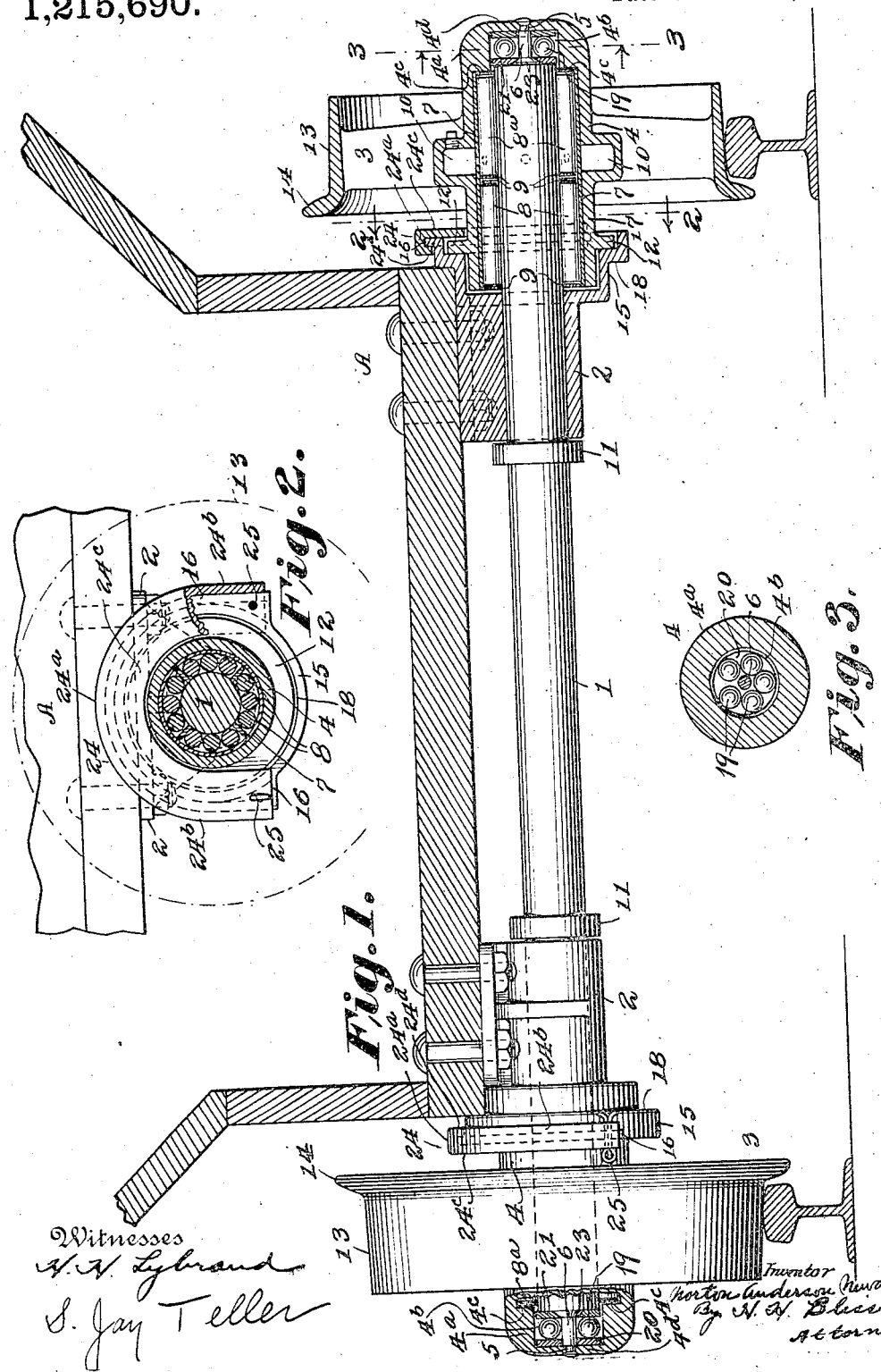

NORTON A. NEWDICK, OF COLUMBUS, OHIO, ASSIGNOR TO THE BONNEY-FLOYD COMPANY, OF COLUMBUS, OHIO, A CORPORATION OF OHIO.

CAR-WHEEL CONSTRUCTION.

1,215,690. Specification of Letters Patent. Patented Feb. 13, 1917.

Application filed October 24, 1914. Serial No. 868,476.

*To all whom it may concern:*

Be it known that I, NORTON ANDERSON NEWDICK, a citizen of the United States, residing at Columbus, in the county of Franklin and State of Ohio, have invented certain new and useful Improvements in Car-Wheel Construction, of which the following is a specification, reference being had therein to the accompanying drawing.

This invention relates to improvements in the mounting and holding devices for mine car wheels.

In the drawings Figure 1 is a view, partly sectional, and partly in elevation, taken transversely of a car, and longitudinally of an axle, in the central vertical plane of the wheels, showing my improvements.

Fig. 2 is a vertical section taken on the plane of the line 2—2 in Fig. 1.

Fig. 3 is a vertical section taken on the plane of the line 3—3 in Fig. 1.

Referring to the drawings, A represents the car body of any preferred construction. 1 indicates one of the axles supported in bearings 2 and provided with rigid collars 11.

The wheel has the outer portion 3 formed with the tread 13 and the flange 14. At the center it has an elongated hub 4 the outer end of which is closed by part 4ª integral with the cylindrical part, there being an axial chamber at 4ᵇ and a shoulder 4ᶜ. The outermost wall portion 4ᵈ has an aperture 5 at the axis. The inner end portion of the hub is formed with a radially projecting flange 12. Within the hub there are two sets of bearing rollers 8 and 8ª provided with cage rings 9, and all fitted within the bushing sleeve 7 which in turn is fitted within the hub.

The box is cast with an outwardly projecting cup-like extension 15, 18, the upper part of which is still farther extended radially outward to form a part of a circular flange 16. 24 is a fastener having an upper arc-shaped part 24ª and legs 24ᵇ together with an integral part 24ᶜ and a narrow flange 24ᵈ. This fastener is adapted to have the outer wider part 24 fit against the outer surface of the flange 16 and have the narrower part 24ᵈ fit against its inner surface. The fastener is secured in place by pins at 25.

The outer end of the axle abuts against an anti-friction bearing consisting of balls 19 and bearing plates 20 and 21. The latter are vertically arranged with the balls between them. The plate 20 bears against the end wall 4ᵈ of the hub. The inner ring 21 is between the end of the axle and the balls. This plate 21 is held in position by the rivet 6 which has a flared or upset head 23 seated in a correspondingly shaped socket in the plate or ring.

The shoulder 4ᶜ is in the longitudinal lines of the roller bearings.

One of the principal purposes of this construction is to provide a design which will permit the builder to utilize standard materials, such as rolled or drawn shafting, roller bearings, bearing balls, and the like, and, at the same time have a car structure whose cost will be reduced to the minimum and to which will be incident superior qualities as concerns strength, durability, strength of parts, transmission of pressure and strains, and the like.

The axle is made of round shafting requiring practically no machine work for fitting it. It is loose in the boxes and will rotate or remain stationary according to circumstances.

When the car is moving rapidly, and, because of a sharp curve in the track, turns (for example to the right), the left hand box presses against the left hand collar 11 and transmits pressure to the anti-friction devices 19, 20, 21, at the opposite end of the axle, this being resisted by the bearing of the flange 14 against the rail.

The anti-friction devices just specified are unitary with the wheel so that they can be detached from this axle without displacing any of their parts.

The arranging of the shoulder at 4ᶜ in the way shown in relation to the roller bearings insures that the latter shall not pass beyond a predetermined limit in relation to the axle, the extreme end part of the latter being free to accommodate itself longitudinally as demanded, the roller bearings at 8 and 8ª remaining virtually fixed relatively to the axle.

The inner part 17 of the hub is prolonged as far as possible so that it can resist the torsional pressure and strain from the tread and flange 14, this pressure being excessive at frequent intervals. It will be understood that the devices herein are designed more particularly for the use of cars running on tracks in coal mines, these tracks having sharp curves at short distances from each other and on short radii of curvature. The excessive pressure of strain transmitted to the inner end of the long part 17 of the hub tends to rapidly cut and wear the contacting surfaces. Heretofore it has been customary, in structures of this class, to employ rollers which extend the whole length of the hub chamber. The pressure at the inner end of the hub, constantly experienced by these mine-car wheels, and the consequent rapid wear of the roller parts, soon reduce the inner ends of the rollers and then they must be replaced with others.

In my construction, as will be seen, I provide two independent sets of cylindrical rollers, those of the first set being in the outer end of the hub and those of the other fitted within the inner end. When torsional strains are experienced by the wheels, tending to impart more pressure at the inner end of the hub than at the outer, the inner rollers can act independently of the outer ones, rotating faster or slower as conditions demand. The more rapidly working parts are independent of the others, and in case of wear it is not necessary to remove an entire system of rollers and to substitute another, it being merely necessary to remove those which have been worn and replace them with another set.

I am aware that mine car wheels have been loosely mounted on axles which in turn were mounted with more or less looseness in their boxes, so that there was a relative end play of the axles in the wheels while the latter were fixed by the track, and that provision was made for having the ends of the axles bear directly against the outer end parts of the hub. But in the earlier constructions referred to the rotary surfaces at the ends of the axles were arranged to bear against parts which did not have rotation relatively to both the axles and the wheels. In some cases the ends of the axles were reduced to points, approximately, and disposed so as to bear against corresponding point-like parts on the wheels; in others the abutting parts on the wheel hubs were each of an area approximately equal to the area of the end surface of the axle. In the present construction the anti-friction element is rotary as to both the axle and the hub, and is so disposed in the hub that the two, together, constitute a unitary device, permitting separation, as above remarked, without detaching the smaller parts.

The parts 19, 20 and 21 constituting the antifriction device at the end of the axle, as will be seen, are allowed a slight looseness of one part relatively to the others to correspond with the looseness incident to the other parts in the wheel mounting and holding mechanism.

As described, there is more or less of radial play of the inner end of the hub, and also some movement of the hub on axial lines. To allow for these the anti-friction devices at 19, at the end of the axle should have the parts so constructed and arranged that while they will always be ready to properly resist the thrust at the end of the axle to obviate friction and wear, they should accomplish this without interfering with the various movements of the inner end of the wheel hub. There is, therefore, permitted a more or less looseness of fitting of the inner end of the hub both in respect to the axial lines and in respect to lines transverse to the axis. The anti-friction bearing at the end of the axle, consequently, should have these parts so constructed and arranged that while they shall always be ready to properly resist the thrust of the axle in such way as to obviate friction and wear, they should accomplish this without interfering with the various actions of the wheel hub at the inner end.

What I claim is:

1. The combination of the body, the bearing, a wheel having a hub, means engaging with the hub to limit its moving axially and to permit its rotating, the axle passing loosely, axially, through the bearing and having its end extended into the wheel hub, and the anti-friction bearing device between the end surface of the axle and the wheel hub and adapted to rotate relatively to both and held permanently in position in the wheel hub independently of the axle.

2. The combination of the body, the bearing, the wheel having a hub with an axial chamber, the axle slidable axially relatively to the bearing and to the wheel, means for holding the wheel axially relatively to the bearing and permitting it to rotate, the anti-friction device between the surface of the end of the axle and the end of the hub and adapted to rotate relatively to both, and means engaging with the hub for holding the anti-friction device permanently in position in the hub.

3. The combination of the body, the bearing, the wheel having a hub with an axle chamber, the axle movable axially in the bearing and in the wheel hub, means interposed between the axle and the body to limit the axial movement of the axle, the axially arranged bearing rollers between the axle and the hub, and the anti-friction device between the end of the axle and the end of the hub and adapted to rotate relatively to both.

4. The combination of the bearing, the wheel, having the hub with an axle chamber a roller bearing chamber around the axle and a chamber for the anti-friction device at the end of the axle, means independent of the axle for limiting the axial movements of the wheel, means independent of the wheel for limiting the axial movement of the axle, the axially arranged bearing rollers between the axle and the wheel, and the anti-friction device in the aforesaid chamber at the end of the axle and rotatable independently of the axle and the wheel.

In testimony whereof, I affix my signature, in presence of two witnesses.

NORTON A. NEWDICK.

Witnesses:
HARRY S. RANSOM.
J. A. THORPE.